United States Patent
Leigh et al.

(10) Patent No.: US 12,139,429 B2
(45) Date of Patent: Nov. 12, 2024

(54) SCALING TREATMENT SYSTEMS FOR WATER HEATERS

(71) Applicant: Rheem Manufacturing Company, Atlanta, GA (US)

(72) Inventors: Taylor Leigh, Alpharetta, GA (US); Jason Lye, Atlanta, GA (US); Atilhan Manay, Montgomery, AL (US); Stephen Phelps, Lilburn, GA (US); Troy Trant, Montgomery, AL (US); Jon Thomas, Atlanta, GA (US); Prudhvi Amaravadhi, Montgomery, AL (US); Edward Holman, Atlanta, GA (US); Fahira Sangare, Atlanta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/113,211

(22) Filed: Dec. 7, 2020

(65) Prior Publication Data
US 2022/0177338 A1 Jun. 9, 2022

(51) Int. Cl.
*C02F 5/08* (2023.01)
*F24D 19/00* (2006.01)
(Continued)

(52) U.S. Cl.
CPC .......... *C02F 5/086* (2013.01); *F24D 19/0092* (2013.01); *F28G 9/00* (2013.01);
(Continued)

(58) Field of Classification Search
CPC ........ C02F 5/086; C02F 5/08; C02F 2103/02; C02F 2209/006; C02F 2209/40;
(Continued)

(56) References Cited

U.S. PATENT DOCUMENTS

| | | |
|---|---|---|
| 3,397,646 A | 8/1968 | Allsopp, Jr. |
| 3,574,883 A | 4/1971 | Brittain et al. |

(Continued)

FOREIGN PATENT DOCUMENTS

| | | |
|---|---|---|
| CN | 1451470 A | 10/2003 |
| CN | 101578238 A | 11/2009 |

(Continued)

OTHER PUBLICATIONS

JP 2014200696 A English description, Oct. 2014, Oyabu Keiko et al.*

(Continued)

*Primary Examiner* — Akash K Varma
(74) *Attorney, Agent, or Firm* — Eversheds Sutherland (US) LLP (57) ABSTRACT

A liquid dosing system is disclosed and can include an inlet conduit and an outlet conduit. The inlet and outlet conduits can each be configured to fluidly communicate a heat exchanger of a water heater. The liquid dosing system can include one or more connector conduits configured to fluidly connect the inlet conduit and the outlet conduit to define a fluid circuit by at least the inlet conduit, the heat exchanger, the outlet conduit, and the one or more connector conduits. The liquid dosing system can include a pump configured to pump water through the fluid circuit, a reservoir configured to store an additive, and a dosing device configured to dispense the additive into the fluid circuit.

20 Claims, 7 Drawing Sheets

(51) Int. Cl.
*F28G 9/00* (2006.01)
*C02F 103/02* (2006.01)

(52) U.S. Cl.
CPC .... *C02F 2103/02* (2013.01); *C02F 2209/006* (2013.01); *C02F 2209/40* (2013.01); *C02F 2301/043* (2013.01)

(58) Field of Classification Search
CPC ........... C02F 2301/043; F24D 19/0092; F24D 19/00; F28G 9/00; B01F 35/82; G01F 1/74; G01F 11/00
USPC ....................................................... 210/696
See application file for complete search history.

(56) References Cited

U.S. PATENT DOCUMENTS

| | | | |
|---|---|---|---|
| 4,178,138 | A | 12/1979 | Iles |
| 4,347,224 | A | 8/1982 | Beckert et al. |
| 4,780,197 | A | 10/1988 | Schuman |
| 4,813,383 | A | 3/1989 | Daugirda |
| 4,886,431 | A | 12/1989 | Soderquist et al. |
| 5,494,527 | A | 2/1996 | Ludwig et al. |
| 5,507,945 | A | 4/1996 | Hansen |
| 5,580,448 | A | 12/1996 | Brandreth, III |
| 5,657,000 | A | 8/1997 | Ellingboe |
| 5,711,654 | A | 1/1998 | Afflerbaugh |
| 5,919,360 | A | 7/1999 | Contaxis, III et al. |
| 5,984,889 | A | 11/1999 | Christ et al. |
| 6,236,321 | B1 | 5/2001 | Troost, IV |
| 6,553,894 | B1 | 4/2003 | Hamon et al. |
| 7,638,042 | B2 | 12/2009 | Astle et al. |
| 8,104,497 | B2 | 1/2012 | Unger et al. |
| 8,840,785 | B2 | 9/2014 | Furukawa et al. |
| 8,940,163 | B2 | 1/2015 | Bassett |
| 9,192,953 | B2 | 11/2015 | Hendricks, Sr. |
| 9,228,575 | B2 | 1/2016 | Oberkorn et al. |
| 9,410,708 | B2 | 8/2016 | Taylor |
| 10,030,401 | B2 | 7/2018 | King et al. |
| 10,323,860 | B1 | 6/2019 | Riblet et al. |
| 10,371,137 | B2 | 8/2019 | Himmelmann |
| 10,507,134 | B2 | 12/2019 | Charles |
| 2004/0092873 | A1 | 5/2004 | Moberg |
| 2004/0167480 | A1 | 8/2004 | Bos |
| 2004/0228735 | A1 | 11/2004 | Byrne |
| 2006/0216212 | A1 | 9/2006 | Lum et al. |
| 2006/0216217 | A1 | 9/2006 | Chan et al. |
| 2006/0245964 | A1 | 11/2006 | Koslov |
| 2007/0060915 | A1 | 3/2007 | Kucklick |
| 2007/0240649 | A1 | 10/2007 | Freeman |
| 2007/0253850 | A1 | 11/2007 | Williams |
| 2007/0270735 | A1 | 11/2007 | Williams et al. |
| 2008/0029541 | A1 | 2/2008 | Wallace et al. |
| 2008/0051698 | A1 | 2/2008 | Takasu et al. |
| 2008/0051709 | A1 | 2/2008 | Mounce et al. |
| 2008/0147023 | A1 | 6/2008 | Hopkins et al. |
| 2008/0154183 | A1 | 6/2008 | Baker et al. |
| 2008/0173705 | A1 | 7/2008 | Girard et al. |
| 2011/0139284 | A1 | 6/2011 | Dyer |
| 2016/0287779 | A1 | 10/2016 | Orczy-Timko et al. |
| 2017/0354234 | A1 | 12/2017 | Streeter |
| 2018/0171996 | A1 | 6/2018 | Cheung et al. |
| 2018/0186656 | A1 | 7/2018 | Drewniak et al. |
| 2019/0002303 | A1 | 1/2019 | Chaudhry et al. |
| 2019/0186787 | A1 | 6/2019 | Wan et al. |
| 2020/0049342 | A1 | 2/2020 | Nowak |
| 2020/0132066 | A1 | 4/2020 | Buskirk et al. |
| 2020/0277719 | A1 | 9/2020 | Driussi |
| 2021/0229975 | A1 | 7/2021 | Mazzola et al. |
| 2021/0332407 | A1 | 10/2021 | Jauss |

FOREIGN PATENT DOCUMENTS

| | | | | |
|---|---|---|---|---|
| DE | 102017114665 | A1 | 1/2019 | |
| EP | 0026704 | A1 | 4/1981 | |
| EP | 1145767 | A2 | 10/2001 | |
| EP | 2125641 | A1 | 12/2009 | |
| EP | 2296520 | A2 | 3/2011 | |
| EP | 2625017 | A1 | 8/2013 | |
| GB | 2385291 | A | 8/2003 | |
| GB | 2386408 | A | 9/2003 | |
| JP | 2007198382 | A | 8/2007 | |
| JP | 2014200696 | A * | 10/2014 | ................ C02F 5/00 |
| SU | 1255740 | A1 | 9/1986 | |
| WO | 2009047000 | A1 | 4/2009 | |
| WO | 2013005086 | A2 | 1/2013 | |

OTHER PUBLICATIONS

International Search Report and Written Opinion for PCT/US2021/061705 dated Mar. 17, 2022 (9 pp.).
International Search Report and Written Opinion for PCT/US2021/061722 dated Mar. 24, 2022 (9 pp.).
International Search Report and Written Opinion for PCT/US2021/061710 dated Apr. 7, 2022 (7 pp.).

\* cited by examiner

SCALING TREATMENT SYSTEMS FOR WATER HEATERS

BACKGROUND

Water hardness refers to the presence of minerals in water, namely calcium, magnesium, iron, and other trace minerals. Water hardness can reduce the efficacy of detergents, cause soap scum buildup in sinks and bathtubs, and result in mineral deposits or spotting on surfaces such as mirrors, tile, and glass that are splashed by the mineral laden water. Water hardness may be designated either permanent or temporary. Permanent water hardness is typically caused by water soluble mineral salts, such as calcium chloride, magnesium sulfate, or iron chloride. Generally, permanent water hardness will not foul heat exchangers and is not impacted by boiling. Permanent hardness can, however, interfere with the action of soaps and detergents and can cause soap scum fouling, water spotting, and/or increased use of soap and cleaners to compensate.

Temporary hardness, on the other hand, can cause problematic limescale fouling on surfaces in contact with the water. Temporary water hardness relates to the presence of minerals, such as calcium, magnesium, iron, and other trace minerals dissolved in the hydrogen carbonate form. Calcium and magnesium hydrogen carbonate are not thermally stable and can decompose into the corresponding carbonate, water, and carbon dioxide upon heating, or more slowly over time with the evolution of carbon dioxide at room temperature. Because calcium carbonate is less soluble in water, it can precipitate as limescale. Some of this limescale can deposit on immersed surfaces, especially heated surfaces. The limescale can build up over time on heat exchanger surfaces, which can eventually result in negative effects. For example, limescale buildup can reduce thermal efficiency, cause overheating of metal parts, reduce water flow, and/or increase use of fuel and or power to heat the water to the desired temperature.

Tankless water heaters (also referenced as instantaneous water heaters) have become widely adopted for their provision of a readily available, continuous flow of hot water and potential energy savings as compared to conventional tank water heaters. Unfortunately, tankless water heaters are more sensitive to the deposition of limescale within the heat exchanger, limiting utility in areas of high water hardness. In particular, the buildup of scale can negatively impact the efficiency of tankless water heaters and can reduce water flow, which can reduce some of the benefits of tankless water heaters.

Efforts have been undertaken to slow or stop limescale buildup in tankless water heaters and other water heating systems by softening the water. For example, temporary hardness can be reduced simply by boiling the water, and allowing the limescale to settle. Other methods exist for removing the calcium and magnesium salts from the water and replacing them with other cations, such as is done using ion-exchange resins. Either the calcium or the hydrogen carbonate can be exchanged for a different counterion, or both ions can be exchanged for hydrogen and hydroxyl ions to make de-ionized water. Other water softening methods include reverse osmosis and distillation.

Other methods may involve treating the water such that the calcium and magnesium stay in the water solution, even after boiling. Some basic approaches in this regard include: (a) complexing the calcium and magnesium ions with a chelating agent, such as ethylenediaminetetraacetic acid (EDTA) so that they remain in solution; (b) treating the water with a mild acid to form water soluble calcium and magnesium salts, such as ethanoic or citric acid; or (c) treating the calcium and magnesium ions with a threshold treatment that prevents limescale formation, such as certain types of phosphates and silicates. For example, the water can be treated with small amounts of sodium hexametaphosphate and/or sodium polyphosphate and/or sodium silicate to prevent limescale formation. Other threshold treatments may include co-polymeric and polyanionic surfactants, such as poly(acrylic acid-styrene-butyl acrylate) block copolymers as a non-limiting example.

Further, systems exist for passively adding sodium hexametaphosphate or another additive to water using the force of the flow of the water. For example, the additive can be added to the flow of water via a venturi or by diffusion. However, such methods often overdose phosphate or underdose the additive. To that end, these passive addition methods can be sensitive to changes in water flow rate and supply water pressure. That is, changes in water flow rate and/or supply water pressure can cause the system to overdose or underdose the additive. As will be appreciated, domestic water pressure can vary depending on, for example, the local altitude, the municipality, and the setting of the pressure regulator at the associated water main.

Underdosing can result in an insufficient amount of additive in the water to prevent scaling, which thus reduces the efficacy and usefulness of the system. For example, once a few gallons of water has flowed past most passive systems, the concentration of added phosphates can drop to the extent that the water coming out of the cartridge is almost indistinguishable from the water entering the cartridge.

Overdosing can result in concentrations of additive that are too high to comply with controlling regulations, for example. If a passive additive system fitted to the water supply is left full of water for an extended duration, excess phosphate can diffuse out of the cartridge and form a high concentration "slug" or mass of additive material in the water that is flowed into the water heater system the next time water is used. In summary, passive systems seem to be constantly in an overdosing or underdosing situation. Thus, there are several difficulties and shortcomings that prevent efficient and effective addition of scale-preventing additives to water.

SUMMARY

These and other problems are addressed by the technologies described herein. Examples of the present disclosure relate generally to systems and devices for dosing water with an additive.

The disclosed technology includes a liquid dosing system for providing an additive to water or another liquid. The liquid dosing system can include an inlet conduit and an outlet conduit. The inlet conduit can be configured to fluidly communicate with a water source and an inlet of a heat exchanger of a water heater, and the outlet conduit can be configured to fluidly communicate with an outlet of the heat exchanger. The outlet conduit can be configured to fluidly connect the outlet of the heat exchanger to an external location, such as a plumbing system or a point of use, for example. The liquid dosing system can include one or more connector conduits configured to fluidly connect the inlet conduit and the outlet conduit such that, when the inlet conduit and outlet conduit are connected to the heat exchanger, a fluid circuit is defined by at least the inlet conduit, the heat exchanger, the outlet conduit, and the one or more connector conduits. The liquid dosing system can include a pump configured to pump water through the fluid circuit, a reservoir configured to store an additive, and a dosing device configured to dispense the additive into the fluid circuit.

The liquid dosing system can include one or more valves, such as one or more check valves. For example, the liquid dosing system can include a first check valve located at a position that is upstream of an intersection between the one or more connector conduits and the inlet conduit, and the first check valve can be configured to (i) permit a flow of water from the water source and into the inlet of the heat exchanger and (ii) prevent a flow of water from the fluid circuit and to the water source. As another example, the liquid dosing system can include a second check valve located at a position that is downstream of an intersection between the one or more connector conduits and the outlet conduit, and the second check valve can be configured to (i) permit a flow of water from the outlet of the heat exchanger and to an external location and (ii) prevent a flow of water from the external location and into the fluid circuit.

The dosing device can include a peristaltic pump, which can include a tube in fluid communication with the reservoir and a rotor system configured to at least partially impinge the tube to move additive through the tube.

The dosing device can include screw dosing system. For example, the dosing device can include a screw and a plunger that is (i) disposed within the reservoir, (ii) connected to the screw, and (iii) configured to move laterally within the reservoir when the screw turns. Thus, the plunger can force the additive out of an outlet as the plunger moves laterally.

The dosing device can include a pump cavity in fluid communication with the reservoir, a diaphragm membrane attached to at least a portion of the pump cavity, and a motor in mechanical communication with the diaphragm membrane. The motor can be configured to (i) pull the additive from the reservoir by moving at least a portion of the diaphragm membrane away from the pump cavity and (ii) push the additive from the pump cavity and toward the fluid circuit by moving the at least a portion of the diaphragm membrane toward the pump cavity.

The dosing device can include a motor to selectively dispense the additive. The motor can include at least one of a stepper motor, a continuous motor with a gear reducer, and a variable frequency drive direct drive motor.

The liquid dosing system can further include a flow sensor configured to detect a flow of water though at least a portion of the fluid circuit. The liquid dosing system can further include a controller. The controller can be in electrical communication with the flow sensor and the dosing device, the controller can be configured to receive flow data from the flow sensor and output instructions for the dosing device to output a predetermined amount of the additive into the fluid circuit. The instructions can based at least in part on the flow data. For example, the controller can be configured to output the instructions for the dosing device in response to determining, based at least in part on the flow data, that water is not flowing from the heat exchanger to an external location. As another example, the controller can be configured to output the instructions for the dosing device in response to determining that water has not flowed from the heat exchanger to an external location for at least a predetermined duration.

The predetermined amount of the additive can correspond to between approximately 1 part per million (ppm) and approximately 10 ppm of the additive in the water. The predetermined amount of the additive can correspond to between approximately 3 ppm and approximately 7 ppm of the additive in the water. The predetermined amount of the additive can correspond to approximately 5 ppm of the additive in the water.

The predetermined amount of the additive can correspond to between approximately 0.020 mL and approximately 0.040 mL of additive per gallon of water flowing through the fluid circuit.

The additive can include at least one of sodium hexametaphosphate and sodium polyphosphate.

At least one of the inlet conduit, the outlet conduit, the one or more connector conduits, the pump, the dosing device, and the flow sensor can be located in the water heater.

The liquid dosing system can be detachably attachable to the water heater.

The pump and the dosing device can be disposed in a housing.

The disclosed technology also includes methods for preventing scaling in a water heater (e.g., by operating a liquid dosing system) as described more fully herein, as well as non-transitory, computer readable mediums storing instructions for performing one or more such methods. For example, the disclosed technology includes a method that can include receiving, from a flow sensor, flow data indicating whether water is flowing from the water heater. The method can include determining that water is not flowing from the water heater and, in response thereto, outputting instructions to (i) output, by a dosing device, a predetermined amount of additive into the fluid circuit defined by a heat exchanger of the water heater, an inlet conduit, an outlet conduit, and one or more connector conduits and (ii) move, by a pump, water through the fluid circuit.

The method can further include outputting instructions for the pump to stop moving water through the fluid circuit in response to (i) the water heater receiving a heated water demand and/or (ii) expiration of a predetermined duration.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

The disclosed technology relates generally to systems and devices for dosing water with an additive to prevent scaling caused by temporary water hardness in a water heating device. Some examples of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range format (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" includes the values 1, 6, and all values therebetween. Likewise, a range described as being "between 1 and 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

Figure 1A:
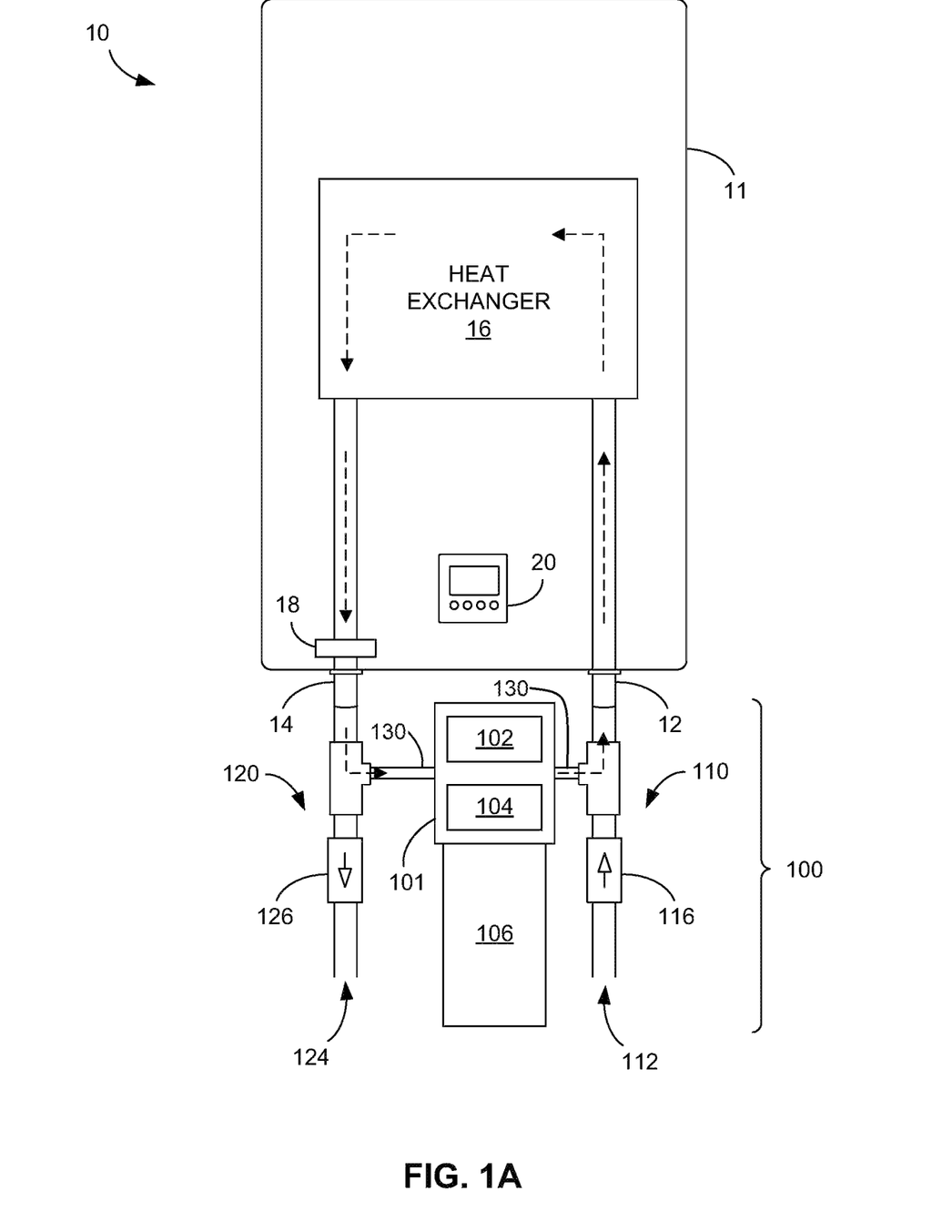
FIG. 1A illustrates a schematic view of an example water heater including an example dosing system, in accordance with the disclosed technology.

Referring to FIG. 1A, an example water heater system 10 is illustrated. The water heater system 10 can include a water heater 11 that is configured to heat water using electrical heating elements or combustion using, for example, natural gas for fuel. The water heater 11 can be configured to receive gas or another fuel via a fuel inlet (not shown). Alternatively or in addition, the water heater 11 can be configured to receive electrical power via one or more electrical contacts, an electrical cord, or the like (not shown). The water heater 11 can also be configured to receive water at a water inlet 12 and output heated water at a hot water outlet 14. To heat the water, the water heater 11 can include a heat exchanger 16, which can receive water from the inlet 12 and output heated water to the outlet 14. The water heater 11 can include a flow sensor 18 and/or can include a user interface 20, which can display information and/or receive inputs from a user. Although the water heater 11 is illustrated as being a tankless water heater, it is contemplated that the disclosed technology can be used with any type of water heater, including a tankless water heater, a storage tank water heater, an electric water heater, a combustion water heater, and a heat pump water heater, as non-exhaustive examples.

Figure 1B:
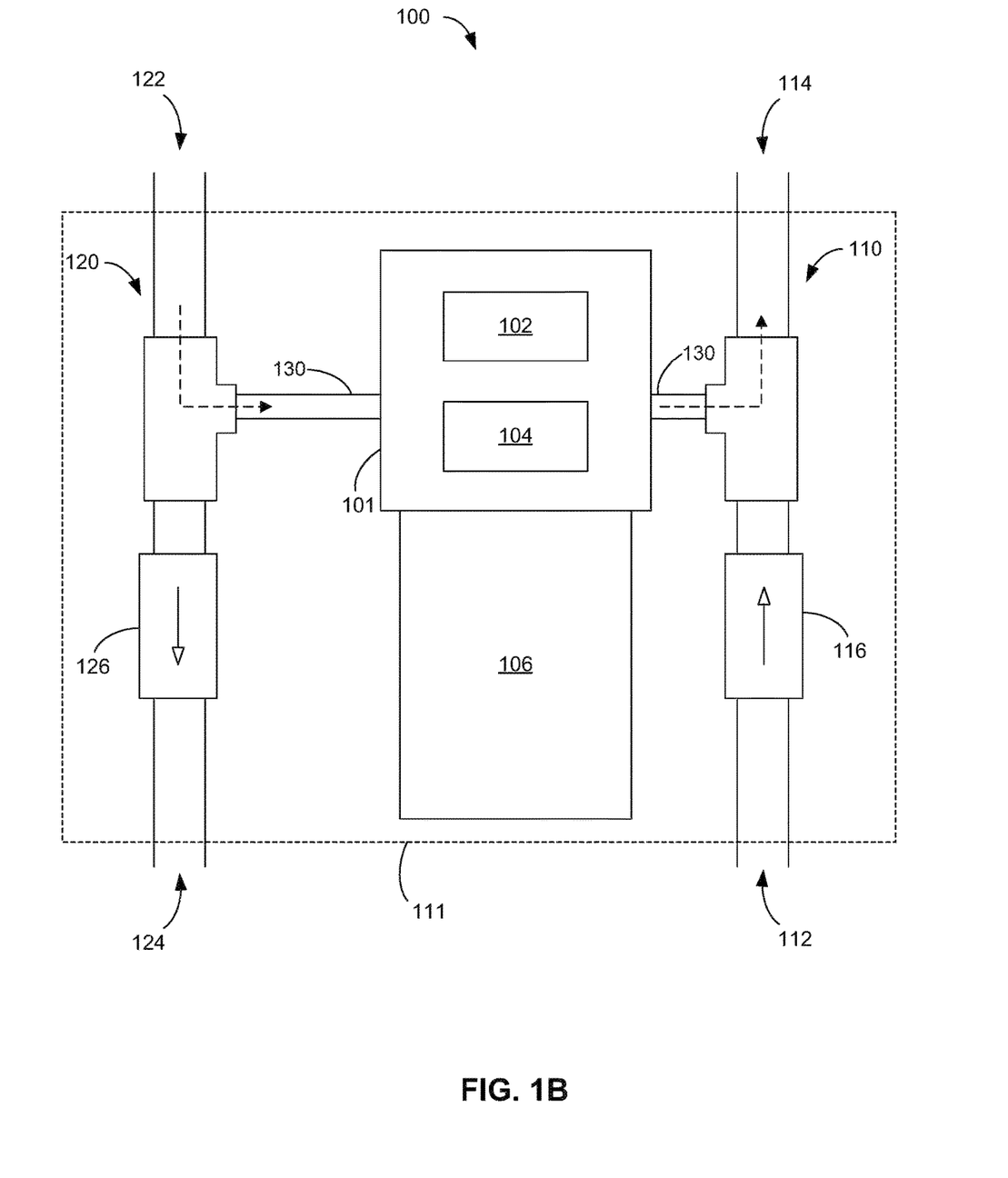
FIG. 1B illustrates a schematic view of an example dosing system, in accordance with the disclosed technology.

A dosing system 100 can be fluidly connected to the water heater 11, as illustrated in FIGS. 1A and 1B, and the dosing system 100 can be configured to treat water in the water heater 11 to treat and/or prevent water hardness. The dosing system 100 can include a pump 102, a dosing device 104, and a container 106 for storing one or more additives for treating water. Optionally, the pump 102 and the dosing device 104 can be disposed in a common housing 101. The additives can used, for example, to treat water hardness. For example, the water can be treated with sodium hexametaphosphate and/or sodium polyphosphate to prevent limescale formation. Generally, regardless of the level of water hardness, adding around 4 parts per million (mg per liter) of sodium hexametaphosphate (also known as "Graham's Salt") to hard water prevents limescale formation; in this regard, the addition of sodium hexametaphosphate can be referred to as a threshold treatment. While the water can still test as hard using a hardness test (because the water still contains calcium and magnesium ions), limescale will not form. Other treatments that can prevent limescale formation include and/or sodium tetrametaphosphate, sodium silicate, the use of neutralized poly(acrylic acid) and acrylate co-polymers, citric acid, hydrochloric acid, acetic acid. While sodium is a common group I cation, other cations associated with various phosphate anions can be used alternatively or in addition. For instance, the sodium+1 cation could be partially or completely replaced by potassium or ammonium cations.

The dosing system 100 can include a system of pipes or conduits configured to circulate water along a fluid circuit comprising the dosing system 100 and the heat exchanger 16 of the water heater 11. The system of pipes can include an inlet conduit 110 and an outlet conduit 120. The inlet conduit 110 can include an inlet 112 configured to receive water from a water source and an outlet 114 configured to discharge water to water heater 11 and, ultimately, the heat exchanger 16. The outlet conduit 120 can include an inlet 122 configured to receive water from the water heater 11 and an outlet 124 configured to discharge water to a desired location (e.g., a plumbing system, a point of use). Optionally, the outlet 114 of the inlet conduit 110 can be configured to connect or attach to the inlet 12 of the water heater 11, and/or the inlet 122 of the outlet conduit 120 can be configured to connect or attach to the outlet 14 of the water heater 11. Thus, the dosing system 100 can be attachable to a water heater 11 using existing connections of the water heater 11 and/or an existing plumbing system.

The dosing system 100 can include one or more connector conduits 130 configured to fluidly connect the inlet conduit 110 and the outlet conduit 120 (e.g., directly, via the pump 102 and/or the dosing device 104). Thus, a fluid circuit can be defined by the pump 102 and dosing device 104, the one or more connector conduits 130, at least a portion of the inlet conduit 110, at least a portion of the outlet conduit 120, the heat exchanger 16, and any pipes or conduits of the water heater 11 for fluidly connecting the dosing system 100 to the heat exchanger 16.

As will be described more fully herein, the dosing system 100 can be configured to discharge an amount of additive into water and flow the additive-charged water into the heat exchanger 16. For example, the dosing system 100 can be configured to circulate additive-charged water into the heat exchanger 16 when the water heater 11 is not discharged heated water to satisfy a heated water demand. To help ensure efficient circulation and delivery of the additive-charged water into the heat exchanger 16, the dosing system 100 can include one or more check valves 116, 126. While the valves 116, 126 are referenced herein as check valves, it is contemplated that one, some, or all of the valves described herein can be another type of valve, such as an actuated valve. As necessary, one, some, or all of the valves described herein can be controlled by a controller. For example, the dosing system 100 can include a first check valve 116 located upstream of the intersection of a connector conduit 130 and the inlet conduit 110, and/or the dosing system 100 can include a second check valve 126 located downstream of the intersection of a connector conduit 130 and the outlet conduit 120. The first check valve 116 can be oriented such that flow is permitted only from the water source and toward the water heater 11, thereby preventing any additive from dissipated or otherwise becoming transported to the water source. The second check valve 126 can be oriented such that flow is permitted only from the water heater 11 and toward the plumbing system, thereby preventing the pump 102 from pulling any water from the plumbing system. Optionally, some or all of the various components of the dosing system 100 (or at least a portion of a given component) can be disposed in a housing 111.

Although the pump 102 and the dosing device 104 are shown in FIGS. 1A and 1B as being located between the inlet conduit 110 and the outlet conduit 120 and fluidly connected to the inlet conduit 110 and the outlet conduit 120 via the connector conduits 130, the pump 102 and/or the dosing device 104 can located at other locations, provided each of the pump 102 and/or the dosing device 104 is located along the fluid circuit. For example, the dosing system 100 may omit the pump 102, and the water heater 11 can include a circulating pump. The dosing system 100 can optionally be configured to communicate with the water heater 11 to control the circulating pump. Alternatively or in addition, the dosing device 104 can be included in the water heater 11 itself. Alternatively or in addition, some other components, or all components, of the dosing system 100 can be included in and/or integral to the water heater 11 itself.

The dosing system 100 or the water heater 11 can include a flow sensor 18. While the flow sensor 18 is shown in FIG. 1A as being located in the water heater 11 on an internal conduit connecting the heat exchanger 16 to the outlet 14 of the water heater 11, the flow sensor 18 can be located at any position from which it can be determined whether water is flowing from the water heater 11 to satisfy a heated water demand. For example, the flow sensor 18 can located in the water heater 11 on an internal conduit connecting the heat exchanger 16 to the inlet 12 of the water heater 11. Alternatively or in addition, the flow sensor 18 can be located in the dosing system 100, such as at a location on the inlet conduit 110 and/or a location on the outlet conduit 120.

Figure 2:
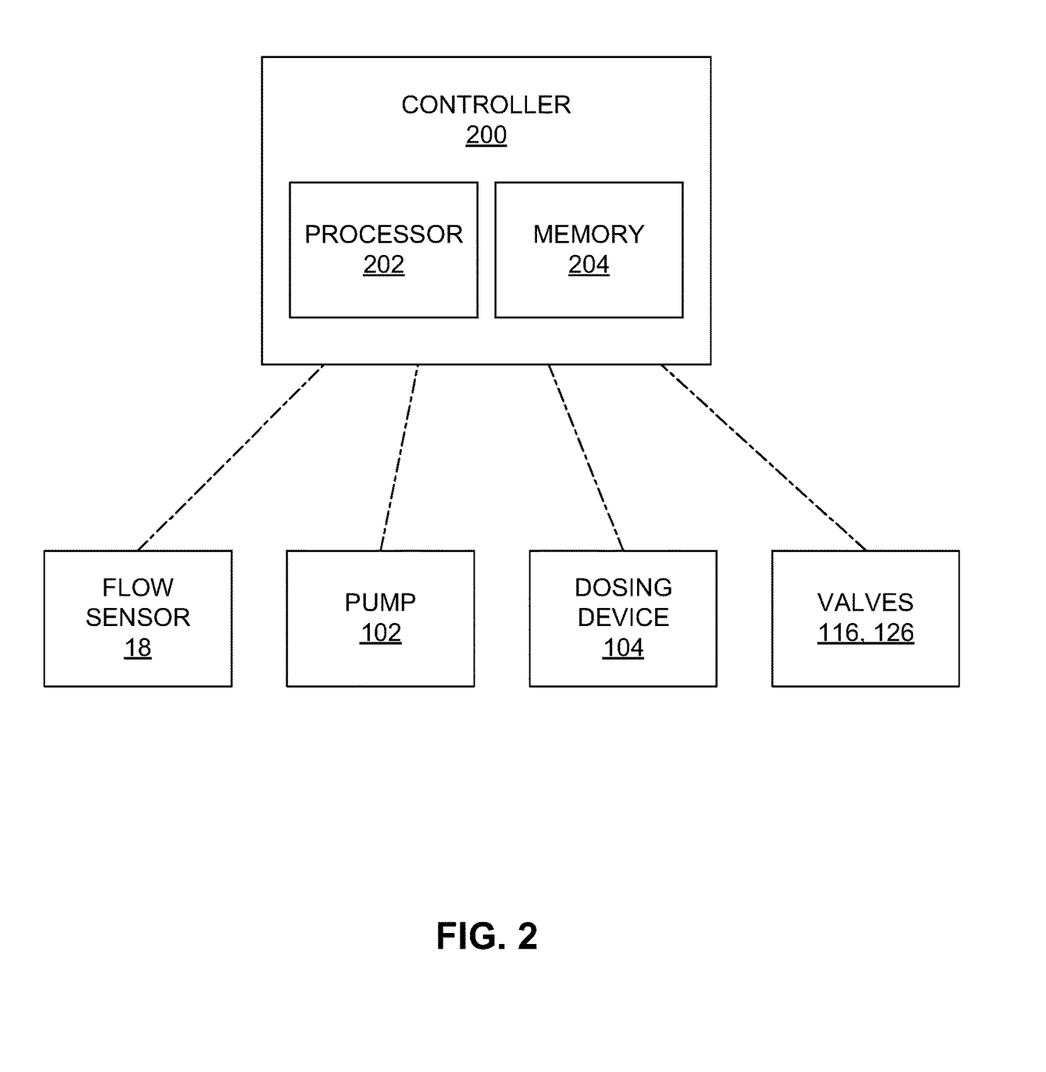
FIG. 2 illustrates a schematic diagram of an example dosing system controller and various components in communication with the dosing system controller, in accordance with the disclosed technology.

Referring to FIG. 2, the dosing system 100 can include a controller 200 configured to receive data from, and/or output instructions to, various components of the dosing system 100. The controller 200 can include a processor 202 and memory 204, and the memory 204 can have instructions stored thereon that, when executed by the processor 202, cause the controller 200 to perform various actions such as described herein. The controller 200 can be configured to be in electric communication with one or more of the flow sensor 18 (e.g., to receive flow rate data), the pump 102 (e.g., to output instructions for operation of the pump 102), the dosing device 104 (e.g., to output instructions for operation of the dosing device 104), and one or more valves 116, 126 (e.g., to output instructions for opening/closing of the respective valve 116, 126). Alternatively, the functionality of the controller 200 described herein can be performed by a controller of the water heater 11. Alternatively still, the controller 200 of the dosing system 100 can be configured to communicate with a controller of the water heater 11, for example, to receive flow data from a flow sensor 18 of the water heater 11.

The dosing device 104 can include any useful device, mechanism, or system for dispensing a precise amount of an additive. The additive can be a concentrated solution of additive (e.g., 700 g·dm$^{-3}$ sodium hexametaphosphate), which can a sufficiently high concentration such that the volume of the container 106 is reduced or minimized. For example, the container 106 can have an internal volume between approximately 80 cubic inches and approximately 110 cubic inches. As a more specific example, the container's 106 internal volume can be approximately 95 cubic inches. Alternatively or in addition, the container 106 can be of sufficient volume to provide the additive for at least a year. For example, the container 106 can be configured to hold between approximately 700 mL and approximately 900 mL of sodium hexametaphosphate (e.g., assuming a daily usage of approximately 84 gallons of hot water for one year, a cartridge having between approximately 700 mL and approximately 900 mL of a 700 g·dm$^{-3}$ sodium hexametaphosphate solution would be sufficient to dose the water to 5 ppm).

The dosing device 104 can include a motor for dispensing the additive. The motor can be or can include, for example, a stepper motor. As additional non-limiting examples, the motor can be or can include a continuous motor (e.g., with a gear reducer) or a direct drive motor (e.g., controlled using a variable frequency drive). The controller 200 can be configured to control the motor to dispense the additive. More completely stated, as discussed more fully herein, the controller 220 (or the water heater's 11 controller) can be configured to control at least some of the pump 102, the dosing device 104, and the valve(s) 116, 126 output or dispense a particular amount of additive from the container 106 based at least in part on the flow rate data.

The motor can include (or be a part of) any useful device or component for delivering or otherwise outputting precise doses of small amounts of additive, which can be a liquid additive. For example, the motor can include or be a part of a device configured to deliver between approximately 0.020 mL and approximately 0.040 mL of additive per gallon of water flowing through the dosing system 100. Alternatively or in addition, the motor can include or be a part of a device configured to deliver between approximately 1 and approximately 10 ppm of sodium hexametaphosphate. Alternatively or in addition, the motor can include or be a part of a device configured to deliver between approximately 3 and approximately 7 ppm of sodium hexametaphosphate. As a more specific example, the motor can include or be a part of a device configured to deliver approximately 0.027 mL of 700 $g \cdot dm^{-3}$ sodium hexametaphosphate per U.S. gallon of cold water flowing through the dosing system. This will result in approximately 5 parts per million (ppm) of sodium hexametaphosphate, which is well below the NSF/ANSI 60 (2016) requirement that concentrations of sodium hexametaphosphate be below 11 ppm for drinking water, yet above the threshold treatment level to effectively prevent limescale deposition in the water heater.

Figure 3:
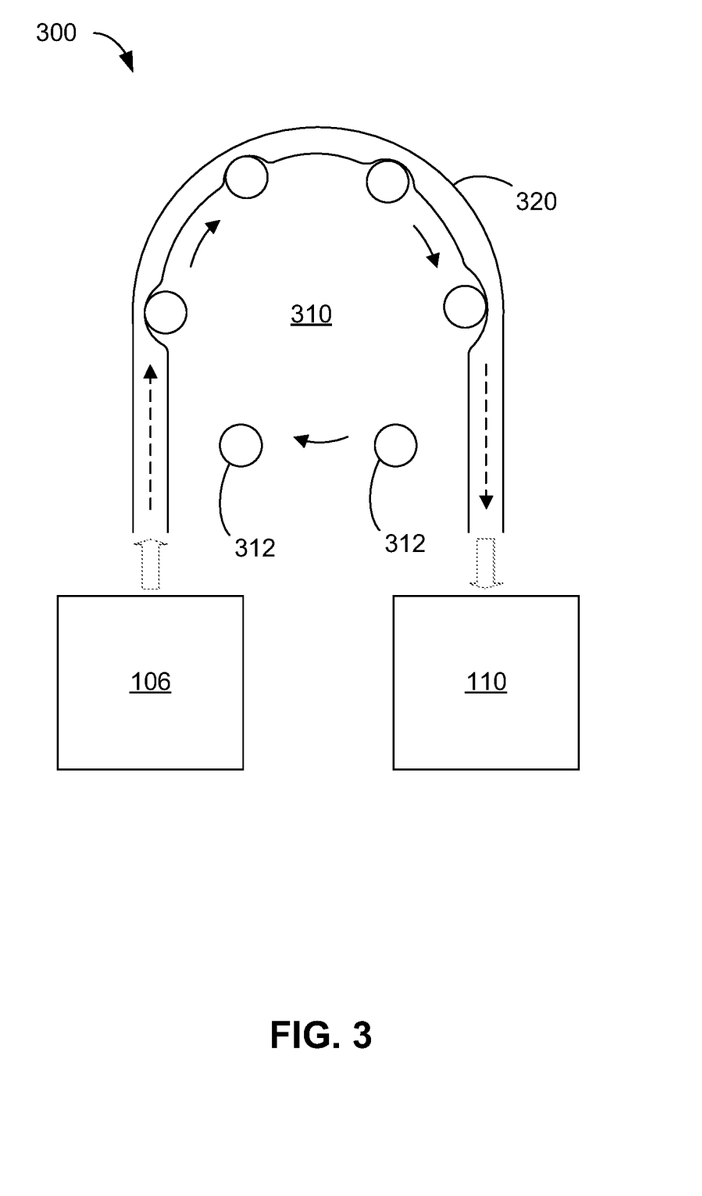
FIG. 3 illustrates a cross-sectional schematic view of an example peristaltic pump of an example dosing system, in accordance with the disclosed technology.

The motor can be a part of or be in communication with a peristaltic pump system, a syringe pump system, a diaphragm pump system, a screw dosing system, or the like. An example peristaltic pump system 300 is illustrated in FIG. 3. The motor can be in mechanical communication with a rotor system 310, which can include a plurality of rotors 312, and the peristaltic pump system 300 can include a flexible tube 320 configured pull the additive from the container 106 and dispense the additive to the inlet conduit 110 or another portion of the fluid circuit. The rotors 312 can be configured to abut the flexible tube 320, and as the motor rotates the rotor system 310, the rotors 312 can press against the flexible tube 320, squeezing the flexible tube 320, and pushing the additive along the length of the flexible tube 320 as the rotor system 310 rotates. In such a manner, precise amounts of the additive can be forced through the flexible tube 320 and out of the container 106. Alternatively, the flexible tube 320 can be included in the container 106. This can help facilitate easy replacement of the flexible tube 320 when the container 106 is replaced, because the flexible tube 320 can become worn over time and/or with prolonged use. If the flexible tube 320 is included in the container 106, the rotor assembly 310 can be located in the dosing device 104 such that, when the container 106 is attached to the dosing device 104, the rotors 312 are aligned with the flexible tube 320.

Figure 4:
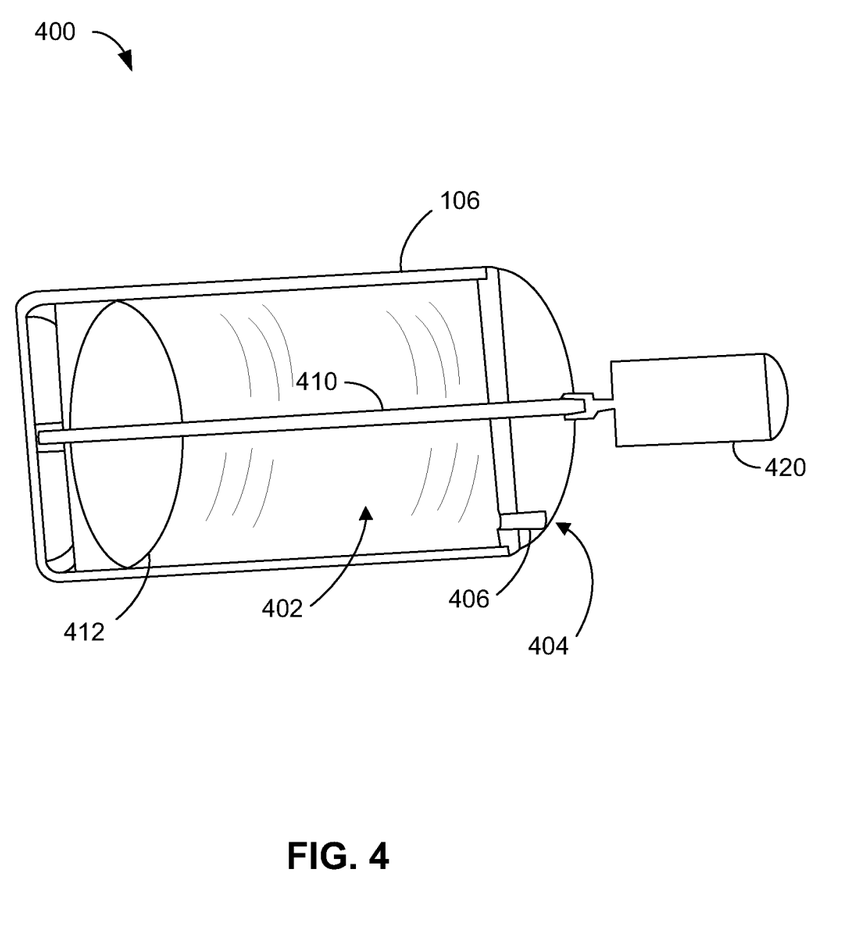
FIG. 4 illustrates a cross-sectional schematic view of an example screw dosing device of an example dosing system, in accordance with the disclosed technology.

Alternatively, the motor can be a part of or be in communication with a syringe pump system or a screw dosing system, such as the example screw dosing system 400 illustrated in FIG. 4. In such a system, the container 106 can include a shaft or screw 410 (e.g., extending through a reservoir 402 of the container 106, extending through a centrally located passage that is fluidly separated from the reservoir 402), and a plunger 412 can be attached to the screw 410 such that, as the screw 410 rotates, the plunger 412 moves laterally through the reservoir 402. When the container 106 is connected to the dosing device 104, the screw 410 can be placed in mechanical communication with the motor (denoted in FIG. 4 as 420 and which can be located in the dosing device 104) such that the motor 420 can rotate the screw 410. As the motor 420 rotates the screw 410, the plunger 412 is moved toward the end of the container 106 proximate the dosing device 104. This movement of the plunger 412 can displace additive located in the reservoir 402, forcing an amount of additive out of an outlet 404 and/or check valve 406. When the container 106 is connected to the dosing device 104, the outlet 404 and/or check valve 406 can be in fluid communication with the inlet conduit 110, thereby dispensing a precise amount of additive from the container 106 and to the water flowing through the inlet conduit 110.

Figure 5A:
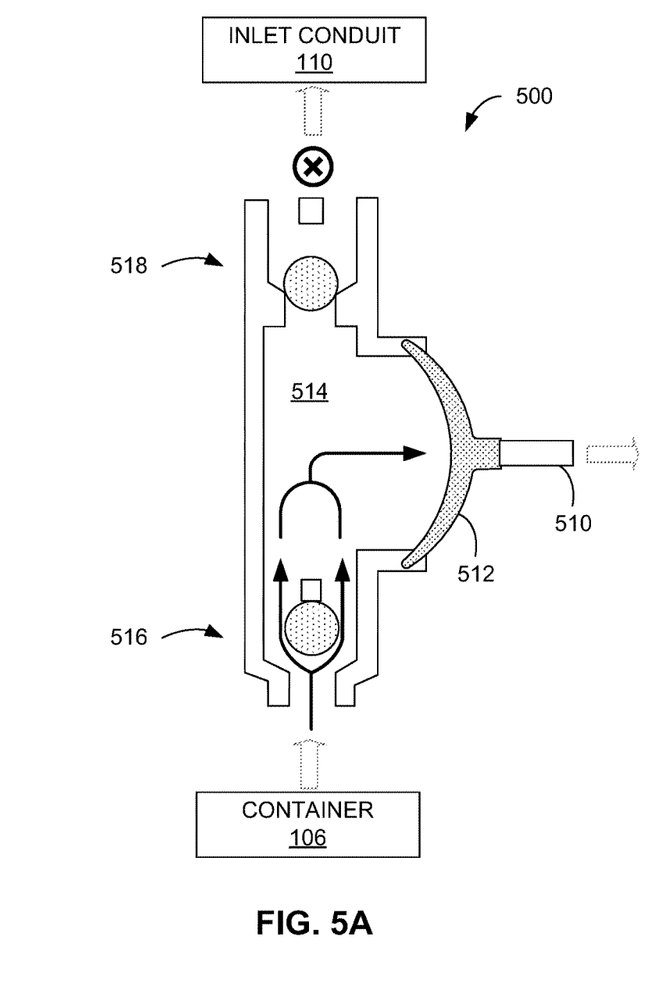
FIGS. 5A and 5B illustrate a cross-sectional schematic view of an example diaphragm pump of an example dosing system, in accordance with the disclosed technology.
Figure 5B:
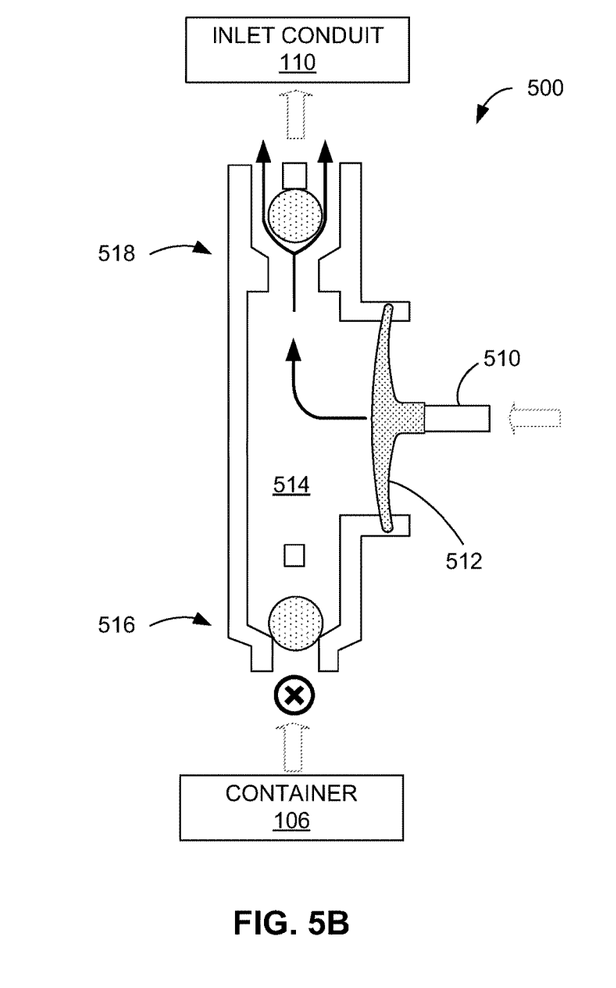

Alternatively, the dosing device 104 can include a diaphragm pump system, such as the example diaphragm pump system 500 illustrated in FIGS. 5A and 5B. At least a portion of the diaphragm pump 500 can be located within the dosing device 104. For example a pump shaft 510 and a diaphragm membrane 512 can be located in the dosing device 104. The diaphragm membrane 512 can be flexible and/or elastic. When the container 106 is connected to the dosing device 104, the reservoir 402 of the container 106 can be fluidly connected to the pump cavity 514. The diaphragm membrane 512 can be attached to at least a portion of the pump cavity 514. A first one-way valve 516 can be located between the reservoir 402 of the container 106 and the pump cavity 514 (i.e., downstream of the reservoir 402 and upstream of the pump cavity 514). The first one-way valve 516 can be located in the container 106 or in the dosing device 104. A second one-way valve 518 can be located in the dosing device 104 between the pump cavity 514 and the inlet conduit 110 (i.e., downstream of the pump cavity 514 and upstream of the inlet conduit 110). When the pump shaft 510 moves away from the pump cavity via the motor (e.g., as illustrated in FIG. 5A), the pump membrane 512 is drawn away from the pump cavity 514, drawing additive from the reservoir 402 of the container 106, through the first one-way valve 516, and into the pump cavity 514. The pump shaft 510 can then be moved toward the pump cavity 514 by the motor (e.g., as illustrated in FIG. 5B), which moves the diaphragm membrane 512 toward the pump cavity 514, pushing the additive from the pump cavity 514, through the second one-way valve 518, and into the inlet conduit 110. Alternatively, the diaphragm pump system 500 can be a piston-type pump system, which can operate similarly as described immediately above, except that a flexible diaphragm membrane is not used. That is, such piston-type systems can include only a motor and piston (e.g., the shaft 510) to pull and push water through the diaphragm pump system 500. The diaphragm pump system 500 can include a piezoelectric motor, an electrical magnet, a motor/cam assembly, or the like to move the diaphragm membrane.

Alternatively, the diaphragm membrane 512 and the pump cavity 514 can be included in the container. This can help facilitate easy replacement of the diaphragm membrane 512 when the container 106 is replaced, because the diaphragm membrane 512 can become worn similar to the flexible tube 214 of the peristatic pump system 300, as described herein.

Optionally, the container 106 can include a display configured to display a status of the container 106. For example, the display can display the amount of additive remaining in the reservoir 402 (e.g., based on data from one or more sensors located in or proximate the reservoir 402). The display can include a display screen, one or more LEDs (e.g., color coded lights), or the like. The display can communicate with the controller 200. Alternatively or in addition, the display can be located on the dosing device 104. Alternatively or in addition, the display can be located on the water heater 11 (e.g., user interface 20). Alternatively or in addition, the container 106, the dosing device 104, or the water heater 11 can include a speaker configured to emit an audible alarm indicating that the amount of additive in the reservoir 402 has fallen below a predetermined threshold amount. Alternatively or in addition, the controller 200 can be in electrical communication with a transceiver and can be configured to communicate with a user's computing device directly or via a network (e.g., via the cloud). For example, the controller 200 can be configured to transmit a message to the user's computing device indicating that the container 106 needs replaced soon, is out of additive, or the like.

As another option, the dosing device 104 can include one or more sensors configured to detect a concentration of additive in the water (e.g., an amount of phosphate added to the water). The sensor(s) can be in electrical communication with the controller 200. For example, the sensor(s) can include a sodium hexametaphosphate selective electrode, a total dissolved solids (TDS) conductivity probe, or the like.

In a dual sensor configuration, the sensors can be TDS probes, and the water running into the dosing system 100 can be tested for TDS at a first location upstream of the location at which the additive is added to the water and at a second location downstream of the location at which the additive is added to the water. The difference between these two measurements can be indicative of the amount of additive added to the water.

In a single sensor configuration, a single sensor can be a sodium hexametaphosphate selective electrode (e.g., as disclosed in US 2020/0158682, the entire contents of which are incorporated herein by reference) and can be installed at a location upstream of the location at which the additive is added to the water.

Alternatively or in addition, a single sensor can be a TDS probe configured to measure electrical conductivity and can be installed at a location upstream of the location at which the additive is added to the water. The TDS probe can be accurate to within approximately 3% (i.e., ±approximately 3%) to detect the amount of sodium hexametaphosphate in moderately hard water regions For added benefit in high hard water regions, which may have up to and including 400 ppm of TDS, the TDS probe can be accurate to within approximately 1% (i.e., ±approximately 1%) to detect the amount of sodium hexametaphosphate. As an example, the controller 200 can be programmed to first calibrate, measuring the TDS of a given volume of untreated water flowing through the system. For an area such as Rock Rapids, Iowa, the initial TDS calibration reading may read 380-400 ppm. As the dosing system 100 begins to operate, the TDS is measured, and the amount of additive added (e.g., approximately 5 ppm) can be monitored by the sensor 232. If the concentration of additive exceeds a predetermined threshold (e.g., a predetermined amount, such as approximately 11 ppm, above the calibration amount), the controller 200 system can stop adding the additive until the concentration of additive falls below the predetermined threshold. When the additive concentration is above the predetermined threshold, the dosing system 100 can output an error indication at the display, to the user's computing device, or the like. To help reduce the likelihood of unreliable data or false positives (e.g., where water supply is variable in conductivity), the controller 200 can be configured to conduct periodic (e.g., once every predetermined duration) system recalibrations.

Optionally, the controller 200 can be configured to monitor historical use data of the dosing system 100. For example, the controller 200 can be configured to detect and monitor when a container 106 is installed, when a container 106 is not installed, when the water heater 11 is running with an empty container 106, and the like. The controller 200 can be configured to transmit this data to a backend server associated with the manufacturer of the water heater 11 or another entity such that the historical data can be used for making warranty determinations (e.g., the warranty for the water heater 11 can require the dosing system 100 to include a non-empty container 106 for at least a threshold percentage of the water heater's 11 installed life in order for the warranty to apply).

As another option, the container 106 can include an electronic tag or other identifier to identify the particular cartridge, batch of additive, and the like. The controller 200 can be configured to associated historical use information with respective identifiers associated with the corresponding container(s) 106. The controller 200 can optionally be configured to cross-reference the identifier with a backend system to ensure the container 106 was manufactured by an approved manufacturer, which can help ensure the container 106 is compatible with the dosing system 100 and will not damage the dosing system 100, the water heater 11, or other systems.

As explained herein, certain portions of the dosing device 104 can be included in the container 106. The portions of the dosing device 104 included in the container 106 can be the components of the dosing device 104 that are most prone to wear and degradation from time and/or use. Accordingly, the dosing system 100 can facilitate easy replacement of such components upon replacement of the container 106 (e.g., when the container 106 runs out of additive). To that end, the reservoir 402 of the container 106 can be dimensioned such that the container 106 will need to be replaced approximately the same time (or before) the expiration of the expected usable life of certain components of the pump system. Moreover, the dosing systems 100 described herein are configured to deliver precise, small amounts of additive to a desired or predetermined dilution (e.g., approximately 5 ppm) regardless of water pressure and flow rate. The dosing systems 100 can be configured to deliver the desired or predetermined dilution of additive regardless of the hardness of the water flowing through the dosing system 100. Thus, the disclosed dosing systems 100 can be useable across a number of municipalities, altitudes, and other location-based factors.

Optionally, a one-way valve (e.g., a check valve) can be located downstream of the dosing device 104 and upstream of the inlet conduit 110 such that water can flow from the dosing device 104 and to the inlet conduit but not in the opposite direction. This can help enable the dosing system 100 to permit water to flow from the water source to the water heater 11 even when a container 106 is not present (i.e., when a container 106 is not connected to the dosing device 104). Further, the dosing device 104 can be configured such that, in the event of a power outage, the motor does not run and no additive is added to the water.

Figure 6:
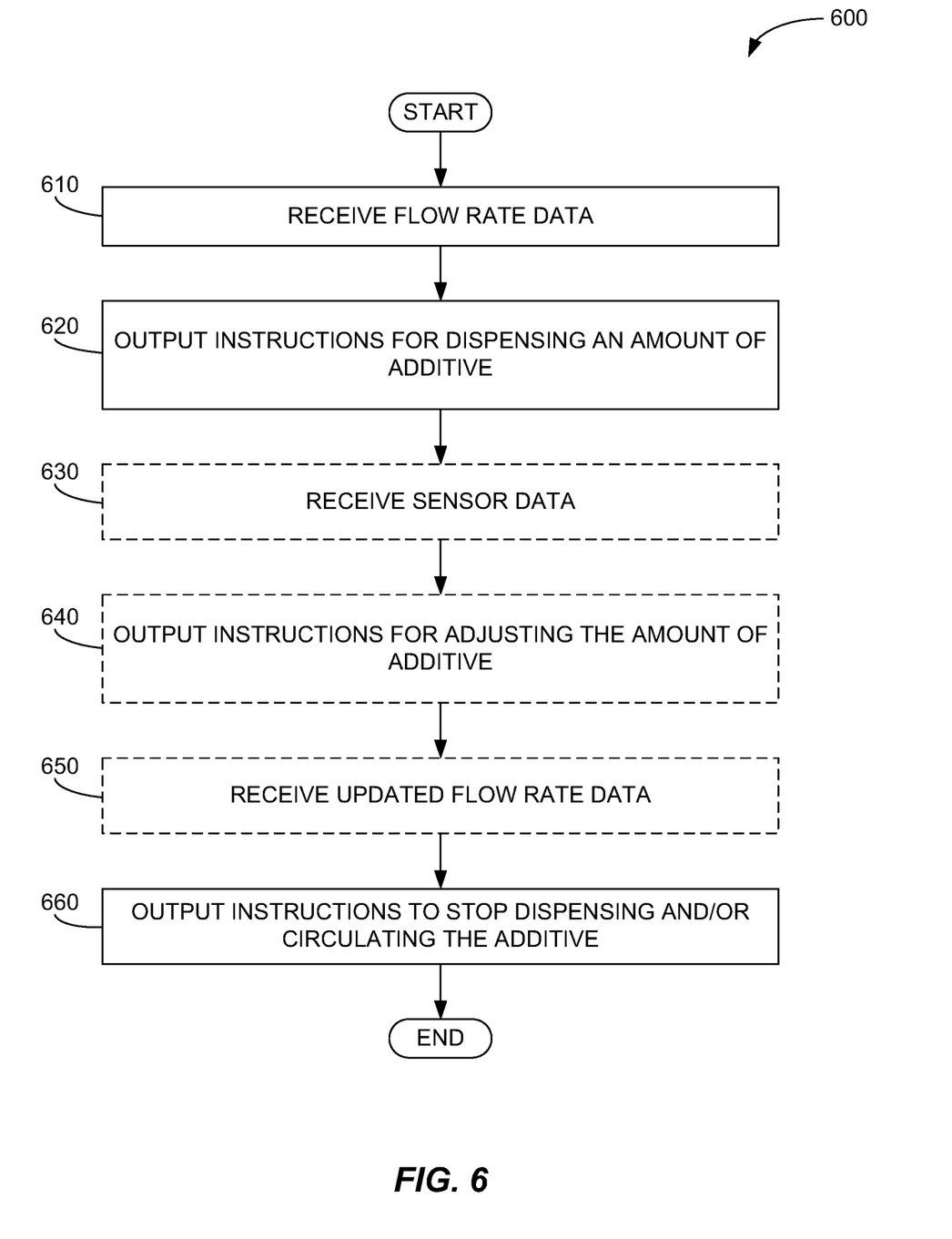
FIG. 6 illustrates a flowchart of an example method for controlling a dosing system, in accordance with the disclosed technology.

The disclosed technology includes a method 600 for controlling a dosing system (e.g., dosing system 100). That is to say, the method 600 can be performed in full or in part by a controller (e.g., controller 200) or some other type of processing circuitry. As described herein, the method 600 can including providing an additive to water in a water heater for preventing scaling in the water heater. However, the method 600 can avoid dispensing the additive to all water flowing through the water heater by waiting to dispense the additive until any water flow through the water heater has stopped. Once the flow has stopped, the method 600 can include dispensing an amount of additive and circulating water through a fluid circuit, such as the fluid circuit described herein, such that the additive can be distributed to the water heater for prevent scaling in the water heater. Because scaling typically occurs while a water heater is at rest, the method 600 can thus provide a sufficient amount of additive to prevent scaling in the water heater without unnecessarily dosing all water that passes through the water heater.

Referring now to FIG. 6, the method 600 can include receiving 610 flow rate data from a flow rate sensor (e.g., flow sensor 18), and the method 600 can include outputting 620 instructions for dispensing a predetermined amount of additive based at least in part on the flow rate data. For example, the method 600 can include determining that the flow rate data indicates that a flow of water through the water heater has stopped. Additionally or alternatively, the method 600 can include determining that the flow of water has stopped for at least a particular amount of time (e.g., at least a predetermined duration), and the method can include, in response to determining the flow of water is stopped or has stopped or has been stopped for at least the particular amount of time, outputting instructions for a dosing device (e.g., dosing device 104) to output a predetermined amount of the additive.

Optionally, the method 600 can include receiving sensor data (e.g., from one or more sensors configured to detect a concentration of additive in the water) indicative of the concentration of the additive in the water. The method 600 can include outputting 640 instructions for adjusting the amount of additive based at least in part on the sensor data. For example, the method 600 can include comparing the additive concentration to a range of permissible concentration values. If the detected concentration is less than the range of permissible concentration values, the method 600 can include outputting instructions for increasing the amount of additive added to the water. If the detected concentration is greater than the range of permissible concentration values, the method 600 can include outputting instructions for decreasing the amount of additive added to the water in a subsequent dosing cycle.

The method 600 can include determining when to stop dispensing the additive and/or when to stop circulating the additive-charged water. For example, the method 600 can include circulating the additive charged water for a predetermined amount of time, and the predetermined amount of time can correspond to the size, shape, and/or type of water heater or heat exchanger. That is, the method 600 can include circulating the additive-charged water for a predetermined amount of time such that a sufficient amount of additive can be provided to the heat exchanger to prevent scaling. Alternatively or in addition, the method 600 can include determining to stop dispensing the additive and/or stop circulating the additive-charged water in response to determining that there is a new heated water demand. That is, the method 600 can including stopping the dosing process in response to determining that heated water is being pulled from the water heater and into a plumbing system, for example. To determine that there is a new heated water demand, the method can include receiving 650 updated flow data from the flow sensor. Regardless of how it is determined that additive dispensing and/or circulation of the additive-charged water should be stopped, the method 600 can include outputting 660 instructions to stop dispensing the additive and/or instructions to stop circulating the additive-charged water. The method 600 can then be repeated, if desired.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "one example," "an example," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Further, certain methods and processes are described herein. It is contemplated that the disclosed methods and processes can include, but do not necessarily include, all steps discussed herein. That is, methods and processes in accordance with the disclosed technology can include some of the disclosed while omitting others. Moreover, methods and processes in accordance with the disclosed technology can include other steps not expressly described herein.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A liquid dosing system comprising:
   an inlet conduit directly connected to a water source and an inlet of a heat exchanger of a water heater;
   an outlet conduit directly connected to an outlet of the heat exchanger;
   a reservoir configured to store an additive;
   a first connector conduit directly connected to the outlet conduit and to the reservoir, and a second connector conduit directly connected to the reservoir and to the inlet conduit such that a fluid circuit is defined by at least the inlet conduit, the heat exchanger, the outlet conduit, the first connector conduit, the second connector conduit, and the reservoir;
   a dosing device configured to dispense the additive into the fluid circuit; and
   a pump configured to pump water through the fluid circuit.

2. The liquid dosing system of claim 1 further comprising:
   a first check valve located at a position that is upstream of an intersection between the second connector conduit and the inlet conduit, the first check valve being configured to (i) permit a flow of water from the water source and into the inlet of the heat exchanger and (ii) prevent a flow of water from the fluid circuit and to the water source; and
   a second check valve located at a position that is downstream of an intersection between the first connector conduit and the outlet conduit, the second check valve being configured to (i) permit a flow of water from the outlet of the heat exchanger and to an external location and (ii) prevent a flow of water from the external location and into the fluid circuit.

3. The liquid dosing system of claim 1, wherein the dosing device comprises a peristaltic pump comprising:
   a tube in fluid communication with the reservoir; and
   a rotor system configured to at least partially impinge the tube to move the additive through the tube.

4. The liquid dosing system of claim 1, wherein the dosing device comprises:
   a screw; and
   a plunger (i) disposed within the reservoir, (ii) connected to the screw, and (iii) configured to move laterally within the reservoir when the screw turns.

5. The liquid dosing system of claim 1, wherein the dosing device comprises:
   a pump cavity in fluid communication with the reservoir;
   a diaphragm membrane attached to at least a portion of the pump cavity;
   a motor in mechanical communication with the diaphragm membrane, and wherein the motor is configured to (i) pull the additive from the reservoir by moving at least a portion of the diaphragm membrane away from the pump cavity and (ii) push the additive from the pump cavity and toward the fluid circuit by moving the at least a portion of the diaphragm membrane toward the pump cavity.

6. The liquid dosing system of claim 1, wherein the dosing device comprises a motor to selectively dispense the additive.

7. The liquid dosing system of claim 6, wherein the motor comprises at least one of a stepper motor, a continuous motor with a gear reducer, and a variable frequency drive direct drive motor.

8. The liquid dosing system of claim 1, further comprising a flow sensor configured to detect a flow of water through at least a portion of the fluid circuit.

9. The liquid dosing system of claim 8 further comprising:
   a controller in electrical communication with the flow sensor and the dosing device, the controller being configured to:
   receive flow data from the flow sensor; and
   output, based at least in part on the flow data, instructions for the dosing device to output a predetermined amount of the additive into the fluid circuit.

10. The liquid dosing system of claim 9, wherein the controller is configured to output the instructions for the dosing device in response to determining, based at least in part on the flow data, that water is not flowing from the heat exchanger to an external location.

11. The liquid dosing system of claim 9, wherein the controller is configured to output the instructions for the dosing device in response to determining that water has not flowed from the heat exchanger to an external location for at least a predetermined duration.

12. The liquid dosing system of claim 9, wherein the predetermined amount of the additive corresponds to between approximately 1 part per million (ppm) and 10 ppm of the additive in the water.

13. The liquid dosing system of claim 9, wherein the predetermined amount of the additive corresponds to between approximately 0.020 mL and approximately 0.040 mL of additive per gallon of water flowing through the fluid circuit.

14. The liquid dosing system of claim 8, wherein at least one of the inlet conduit, the outlet conduit, the first connector conduit, the second connector conduit, the pump, the dosing device, and the flow sensor is located in the water heater.

15. The liquid dosing system of claim 1, wherein the liquid dosing system is detachably attachable to the water heater.

16. The liquid dosing system of claim 1, wherein the pump and the dosing device are disposed in a housing.

17. The liquid dosing system of claim 1, wherein the additive comprises at least one of sodium hexametaphosphate and sodium polyphosphate.

18. A liquid dosing system comprising:
   an inlet conduit directly connected to a water source and an inlet of a heat exchanger of a water heater;
   an outlet conduit directly connected to an outlet of the heat exchanger;
   a reservoir configured to store an additive;
   a first connector conduit directly connected to the outlet conduit and to the reservoir, and a second connector conduit directly connected to the reservoir and to the inlet conduit such that, when the inlet conduit and the outlet conduit are connected to the heat exchanger, a fluid circuit is defined by at least the inlet conduit, the heat exchanger, the outlet conduit, the first connector conduit, the second connector conduit, and the reservoir;
   a dosing device configured to dispense the additive into the fluid circuit; and
   a pump configured to pump water through the fluid circuit,
   wherein the water heater is a tankless water heater.

19. The liquid dosing system of claim 1, wherein the dosing device is configured to output a predetermined amount of the additive into the fluid circuit.

20. The liquid dosing system of claim 19, wherein the predetermined amount is between approximately 0.02 mL and approximately 0.04 mL of additive per gallon of water flowing through the fluid circuit.

* * * * *